US011891143B2

(12) United States Patent
Thorpe

(10) Patent No.: US 11,891,143 B2
(45) Date of Patent: Feb. 6, 2024

(54) BELT DRIVEN PEDAL CYCLE EMPLOYING A SLIM PROTECTIVE BELT DRIVE COVER

(71) Applicant: Karbon Kinetics Limited, Chessington (GB)

(72) Inventor: Richard Thorpe, Thames Ditton (GB)

(73) Assignee: Karbon Kinetics Limited, Chessington (GB)

( * ) Notice: Subject to any disclaimer, the term of this patent is extended or adjusted under 35 U.S.C. 154(b) by 160 days.

(21) Appl. No.: 17/553,378

(22) Filed: Dec. 16, 2021

(65) Prior Publication Data
US 2022/0119064 A1 Apr. 21, 2022

Related U.S. Application Data

(63) Continuation of application No. PCT/GB2020/051447, filed on Jun. 16, 2020.

(30) Foreign Application Priority Data

Jun. 17, 2019 (GB) ...................................... 1908657

(51) Int. Cl.
*B62J 13/06* (2006.01)
(52) U.S. Cl.
CPC ..................................... *B62J 13/06* (2013.01)
(58) Field of Classification Search
CPC ... B62J 13/00; B62J 13/04; B62J 13/06; B62J 13/02; F16P 1/02; F16H 57/035; F16H 2057/0325; F16H 57/031; F16H 2700/06; F16H 7/18
USPC .......................................................... 474/144
See application file for complete search history.

(56) References Cited

U.S. PATENT DOCUMENTS

| 628,406 | A | * | 7/1899 | Griswold | ................. | B62J 13/00 |
| | | | | | | 474/147 |
| 952,647 | A | * | 3/1910 | Sorensen | ................. | B62J 13/00 |
| | | | | | | 74/609 |
| 1,400,131 | A | * | 12/1921 | Adams | ..................... | B62J 13/02 |
| | | | | | | D12/127 |

(Continued)

FOREIGN PATENT DOCUMENTS

DE 202004004726 6/2004
EP 1842769 10/2007

(Continued)

OTHER PUBLICATIONS

WIPO, International Search Report and Written Opinion dated Sep. 21, 2020, in PCT/GB2020/051447, 11 pgs.

(Continued)

*Primary Examiner* — Henry Y Liu
(74) *Attorney, Agent, or Firm* — Henry Patent Law Firm PLLC

(57) ABSTRACT

A pedal driven cycle comprising a belt drive connecting a power input sprocket to a driven sprocket along a chain line; an outer protective belt drive cover plate having a footprint which substantially coincides with a side profile of the belt drive along at least a major portion of its length of travel so that the outer cover plate does not extend beyond an outer surface of the belt drive; and fixtures for mounting the outer protective belt drive cover plate to the cycle in parallel with the chain line and laterally spaced apart from a side edge of the belt drive to provide a clearance, with fore and aft adjustment.

16 Claims, 13 Drawing Sheets

(56) References Cited

U.S. PATENT DOCUMENTS

| | | | | |
|---|---|---|---|---|
| 1,538,853 | A * | 5/1925 | Hazelton | F16P 1/02 474/144 |
| 2,607,241 | A * | 8/1952 | Peterson | F16P 1/02 474/146 |
| 3,885,471 | A * | 5/1975 | Morine | F16P 1/02 474/144 |
| 3,927,578 | A * | 12/1975 | Mattila | F16P 1/02 474/146 |
| 4,240,303 | A * | 12/1980 | Mosley | F16H 57/04 474/151 |
| 4,632,416 | A * | 12/1986 | Zelenetz | B62J 13/04 474/146 |
| 5,312,303 | A * | 5/1994 | Hinschlager | B62J 13/04 474/146 |
| 5,320,583 | A * | 6/1994 | van Wingen born Looyen | B62J 13/00 74/609 |
| 5,520,584 | A * | 5/1996 | Brown, III | B62J 13/06 474/146 |
| 5,957,796 | A * | 9/1999 | McLean | F04B 53/16 417/313 |
| 6,332,853 | B1 * | 12/2001 | Bowman | B62J 13/04 474/146 |
| 7,066,857 | B1 * | 6/2006 | DeRosa | B62J 23/00 82/146 |
| 7,544,154 | B2 * | 6/2009 | Corbalis | A63B 22/0605 474/144 |
| 7,874,951 | B2 * | 1/2011 | Leiss | F04B 17/06 474/146 |
| 7,951,031 | B2 * | 5/2011 | Hioki | B62J 13/04 474/146 |
| 2001/0023211 | A1 * | 9/2001 | Bowman | B62J 23/00 474/146 |
| 2003/0224891 | A1 * | 12/2003 | Chou | B62M 9/16 474/146 |
| 2006/0058139 | A1 * | 3/2006 | Fry | B62J 13/00 474/144 |
| 2006/0172838 | A1 * | 8/2006 | DaSantos | B62J 13/00 474/144 |
| 2008/0125261 | A1 * | 5/2008 | Sommers | B62J 13/00 474/144 |
| 2010/0323834 | A1 * | 12/2010 | Grube | F16H 7/02 474/144 |
| 2011/0224040 | A1 * | 9/2011 | Boissonneault | F16H 57/035 474/146 |
| 2011/0251003 | A1 * | 10/2011 | Nishimiya | F16H 7/02 474/144 |
| 2013/0337955 | A1 * | 12/2013 | Ono | B62J 13/00 474/144 |
| 2015/0218882 | A1 * | 8/2015 | Greening | E06B 9/42 474/158 |
| 2018/0229793 | A1 * | 8/2018 | Cody | B62J 13/00 |
| 2018/0339744 | A1 * | 11/2018 | McFarland | B62J 13/04 |

FOREIGN PATENT DOCUMENTS

| | | |
|---|---|---|
| EP | 2353980 | 8/2011 |
| EP | 3434568 | 1/2019 |
| GB | 2584857 | 12/2020 |
| WO | 2007088275 | 8/2007 |

OTHER PUBLICATIONS

"TF-2000 Top Fuel: Belt Drives, Ltd.", https://web.archive.org/web/20170526141749/http://beltdrives.com/open-drives-2/belt-drive-kits-for-softail-and-dyna-models/tf-2000-top-fuel, 2 pgs.

UKIPO, Search Report dated Jan. 24, 2020, in GB1908657.8, 1 pg.

* cited by examiner

BELT DRIVEN PEDAL CYCLE EMPLOYING A SLIM PROTECTIVE BELT DRIVE COVER

CROSS-REFERENCE TO RELATED APPLICATIONS

This application is a continuation of PCT/GB2020/051447 filed Jun. 16, 2020, which claims priority to GB 1908657.8, filed Jun. 17, 2019, the disclosures of which are hereby incorporated by reference.

BACKGROUND

The vast majority of pedal driven cycles, bicycles for example, employ a metallic linked roller type chain to transmit power input by the rider through the pedal cranks to the rear wheel. The advantages of roller chains are well known and include being highly efficient, durable, compact and relatively low cost. Other advantages of the linked roller type chain are that they are able to operate efficiently over a wide range of tensions between the sprockets as well as being highly flexible laterally and thus are able to be used in combination with well understood multi-speed derailleur gearing systems. However, bicycle roller chains have certain disadvantages such as requiring oil lubrication to run efficiently and also to prevent corrosion and rust. Over time, the lubrication will diminish through usage and weather conditions such as rain at which point, unless the chain is re-lubricated, the chain with rust or corrode and will tend to produce more noise even to the point of squeaking. Oil lubrication can collect dirt which can spoil the rider's clothing, living spaces, and skin. Another problem with linked roller type chains is tendency for the riders clothing to become trapped or drawn into the interface between the teeth of the driven and driving sprockets and the chain.

In order to address the drawback of an oily chain spoiling the rider's clothing, living spaces, and skin as well as preventing rain or dirt from collecting on the chain and to prevent the rider's clothes from becoming trapped between the chain and sprockets, designers have employed so called chain covers to cover and enclose the entire chain drive. These protective chain covers have been used for nearly 100 years and are well known. A key attribute that designers of protective chain covers must consider is to provide sufficient clearance between the inside of the cover and the chain in order that the chain during normal operation does not contact the protective chain cover which will result in an-acceptable noise such as a clanking or rattling sound. The width and height of the chain is of critical importance as it determines the minimum size and shape of the protective chain cover. Most generally accepted as a key practical and commercial benefit and desirable is that the protective chain cover is designed to be as small and compact as possible so as not to protrude beyond the outer chain perimeter when viewed from the side. Protective chain covers must also allow access to the chain for replacement or service and therefore they are usually comprised of an inner and an outer half that join together generally on the centreline of the chain when viewed from the top of the bicycle. The joint of the two protective chain halves will also generally have an overlap to keep out water and keep in oil. This overlapped has the drawback of essentially doubling the thickness of the protective chain cover wall section and therefore the protective chain cover is required to be even larger beyond the outer perimeter of the chain drive when viewed from the side. Some protective chain covers are only focused on preventing the rider's clothes from becoming trapped in the chain and sprockets and thus only cover the area of the chain towards the driving sprocket and pedal crank assembly. These covers are also generally only comprised of a singular outer protective chain cover.

There have been many attempts over the past 50 years to address the drawbacks of the bicycle roller chain by employing a non-metallic toothed belt drive instead of the traditional metallic linked roller type chain. Toothed belt drives have been successfully used in car engine timing applications, medical fields, as well as the food processing industry. A key advantage of a toothed belt drive is that it does not require any lubrication and therefore they do not spoil the rider's clothing, skin, or living spaces. Another advantage of toothed belt drives is that they produce less noise than metallic roller chains. Toothed belt drives are made in one continuous un-ended loop and do not have links and are made of multiple types of materials such as rubber imbedded with high strength fibres to transmit power such as nylon, carbon, or aramid for example. This means that toothed belt drives are manufactured in specific lengths and require a mechanism for adjusting the tension of the belt when fitted to joining the belt sprockets being driven. The flexibility, weight, and power transmission capability of belt drives has improved dramatically over the past decade to a point that toothed belt drives are now able to approach the efficiency of a bicycle linked roller chain and increasingly more pedal operable cycles are being fitted with belt drives.

However, with regards to the field of pedal operated cycles such as bicycles, belt drives have certain drawbacks when compared to linked roller chains. In order to operate efficiently belt drives must operate within a narrow tolerance of tension and alignment such that all bicycle frames need to have a mechanism for adjusting the tension of the belt as the belt wears in over its life. Adjustment mechanisms are well known and understood and are usually of the so called eccentric bottom bracket type or the so called horizontal slotted rear drop out type. These two methods of adjusting belt tension are most widely used and the tension is varied simply by lengthening or shorting the distance between the axis of the pedal input driving sprocket and the axis of the rear wheel driven sprocket. Other less common types of belt drive tension adjustment are the well-known so called idler pulley system such as found on car timing belt applications. Generally, tension of the belt is adjusted occasionally over many hundreds of miles of usage.

Another drawback of belt drives compared to linked roller type chains is that they are wider. This can prove problematic for designers in that the critical so called "chain line" of the bicycle requires careful consideration in order to have sufficient clearance between the belt drive and the rear tyre, the frame and gear components and also be positioned for ergonomic and efficient, comfortable pedal crank operation.

Belt drives are not suitable for multi-speed derailleur gearing systems due to the fact that they are not laterally compliant, they are of fixed length, and require precise tension to operate efficiently. Thus all belt driven pedal cycles employ well understood multispeed rear internal hub gear systems or front pedal crank located internal gearing systems, such as the German made Pinion™ branded bicycle gearbox. These internal gearing systems operate with a constant and fixed so called "chain line".

Belt drives also suffer from the same problem as linked roller chains of the possibility for the rider's clothing to become trapped between the belt and the sprockets. Whilst the popularity of belt drives is increasing, designers have not widely addressed this key drawback by adding a protective belt cover. The main reason for this is that due to the greater width of the belt compared to the linked roller chain, a protective belt drive cover of the traditional design variety used on linked roller chain bicycle becomes too large and bulky to be commercially appealing. The need to join the cover with an overlap joint further increases the size of the cover and has the drawback of trapping water within the cover. Furthermore, joined up enclosed covers can resonate more noise than open covers. Additionally, because the accepted best practice for maintaining and adjusting critical belt tension is by means of the well known eccentric bottom bracket adjustment or horizontal slotted rear dropout adjustment, which changes the distance from the axis of the front driving pedal crank sprocket and the axis of the rear driven wheel sprocket, even more clearance must be designed into the protective belt cover in order to account for the maximum possible centre distance of the sprockets and still provide adequate clearance between the belt and the inside of the protective belt cover. This results in an even larger protective belt cover than traditional protective chain covers and is generally accepted as undesirable to the rider, being visually bulky and unappealing, adding undesirable cost, and adding undesirable weight.

SUMMARY OF THE INVENTION

A novel and inventive solution to this problem of protecting the rider from trapping their clothes between the belt and sprocket is a slim protective belt drive cover that is compact, visually appealing, lightweight, and provides a means to accommodate the variation of sprocket centre distance required when adjusting the tension of the belt drive. Exemplary embodiments comprise an inner and an outer protective belt drive cover shaped substantially similar in outer profile to follow and align with the outer non-toothed perimeter surface of the belt when viewed from the side such that the protective belt drive covers do not extend substantially beyond the outer non-toothed perimeter surface profile of the belt. When viewed from the top, the inner and outer protective belt drive covers are positioned such that they follow and align closely with the sides of the belt and have each a nominal and consistent clearance gap of up to 10 mm between the belt sides and the covers. The arrangement of the covers is such that the outer and inner covers are not joined together and do not enclose the belt around the outer non-toothed perimeter surface of the belt and therefore do not constrain or limit the change in centre distance of the sprockets when the belt is adjusted to the correct belt tension. Due to the unique and novel position of the inner and outer covers to closely align with the outer perimeter non-toothed surface of the belt, the protective cover provides substantially improved prevention of the rider's clothing from becoming trapped between the belt and the sprocket. Because the protective cover does not enclose the entire belt drive, it is lighter, lower in cost, and also more compact, slim and visually appealing than traditional protective chain cover designs. The slim and more compact nature of the protective cover is more aerodynamic than a traditional fully enclosed protective chain cover design. The split two part nature of the cover allows for easy access to the belt drive by only needing to remove one cover.

According to an aspect of the invention, there is a pedal driven cycle comprising: a belt drive connecting a power input sprocket to a driven sprocket along a chain line; an outer protective belt drive cover plate having a footprint which substantially coincides with a side profile of the belt drive along at least a major portion of its length of travel so that the outer cover plate does not extend beyond an outer surface of the belt drive; and, fixtures for mounting the outer protective belt drive cover plate to the cycle in parallel with the chain line and laterally spaced apart from a side edge of the belt drive to provide a clearance, with fore and aft adjustment of the outer cover plate.

The clearance is preferably no more than 10 mm, more preferably no more than 8 mm, even more preferably no more than 5 mm, and most preferably approximately 2 mm.

Preferably, the fore and aft adjustment is relative to one or both of the input sprocket and the driven sprocket.

Preferably, the belt driven cycle further comprises an inner protective belt drive cover plate having a second footprint that substantially coincides with the footprint of the outer protective belt drive cover plate, wherein the inner protective belt drive cover plate is substantially aligned with the outer protective belt driver cover plate and laterally spaced apart from an inside edge of the belt drive to provide a second clearance, and preferably no more than 5 mm.

The second clearance is preferably no more than 10 mm, more preferably no more than 8 mm, even more preferably no more than 5 mm, and most preferably approximately 2 mm.

Preferably, the footprint of the outer protective belt drive cover plate substantially coincides with a side profile of the belt drive along the entire length of the belt drive.

Optionally, the inner and outer protective belt drive cover plates are not a structural part of a frame of the cycle.

Alternatively, the inner and/or outer protective belt drive cover plates may be a structural part of a frame of the cycle.

BRIEF DESCRIPTION OF DRAWINGS

Examples of the present invention will now be described in detail with reference to the accompanying drawings, in which.

DETAILED DESCRIPTION

Figure 1:
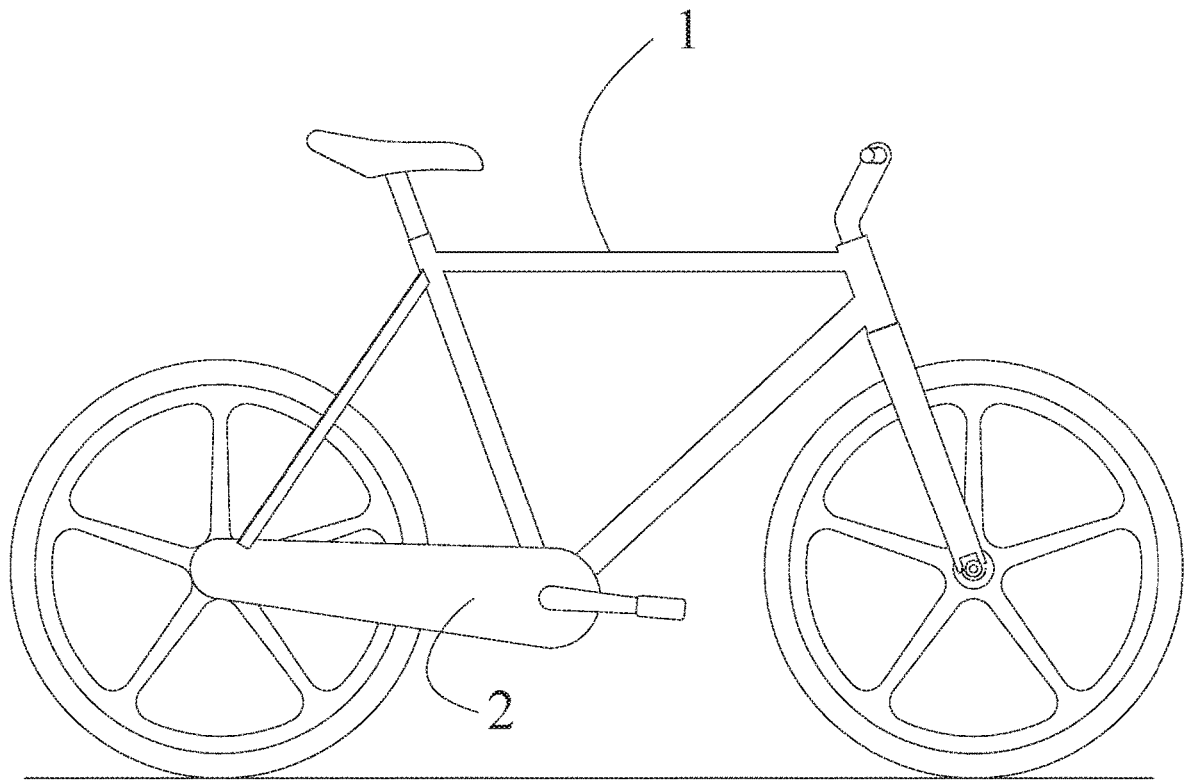
FIG. 1 is a right side view of a belt driven bicycle comprising a drive belt cover.

FIG. 1 shows a first embodiment comprising a belt driven pedal cycle 1 and a slim protective belt drive cover 2.

Figure 2:
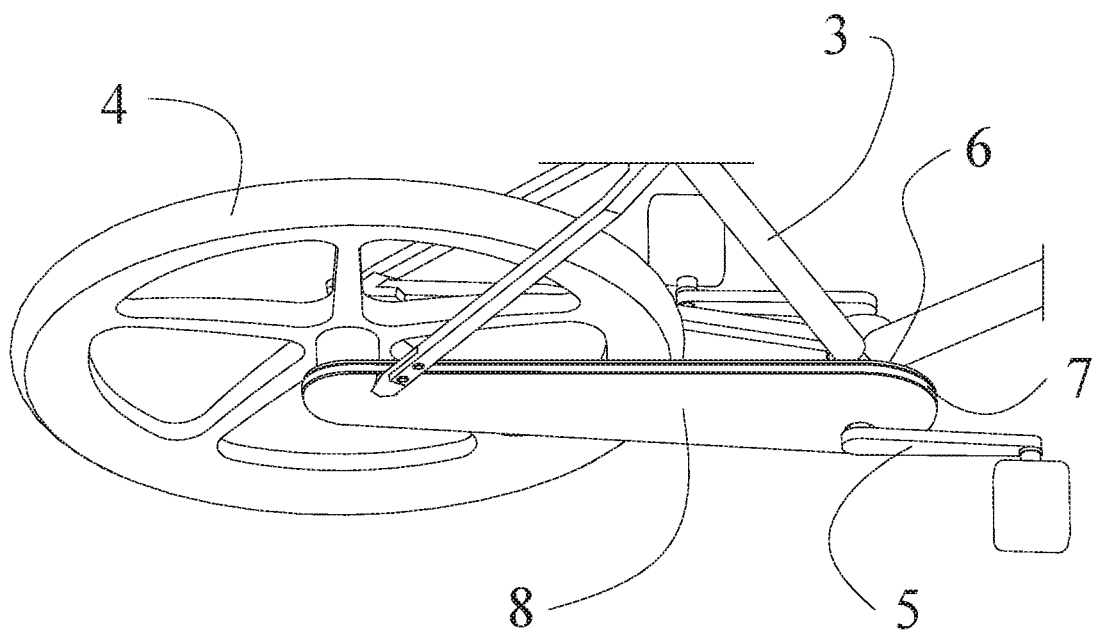
FIG. 2 is a right perspective view of a belt drive system of the bicycle of FIG. 1.

As shown in the perspective view of FIG. 2, the illustrated embodiment comprises a bicycle frame 3 fitted with a rear hub wheel assembly 4, a pedal crank assembly 5, an inner belt cover 6, an outer belt cover 8 and a belt drive 7 such that power rotatably input through pedal crank assembly 5 is transmittable to rear hub wheel assembly 4 through belt drive 7. Inner belt cover 6 and outer belt cover 8 may be made from materials such as plastic, metals, or composites and could be manufactured through injection moulding, forming, or other pressure type moulding processes for example. Inner belt cover 6 and outer belt cover 8 are not essential for the structural integrity of bicycle frame 3 in the embodiment presented in FIG. 2.

Figure 3:
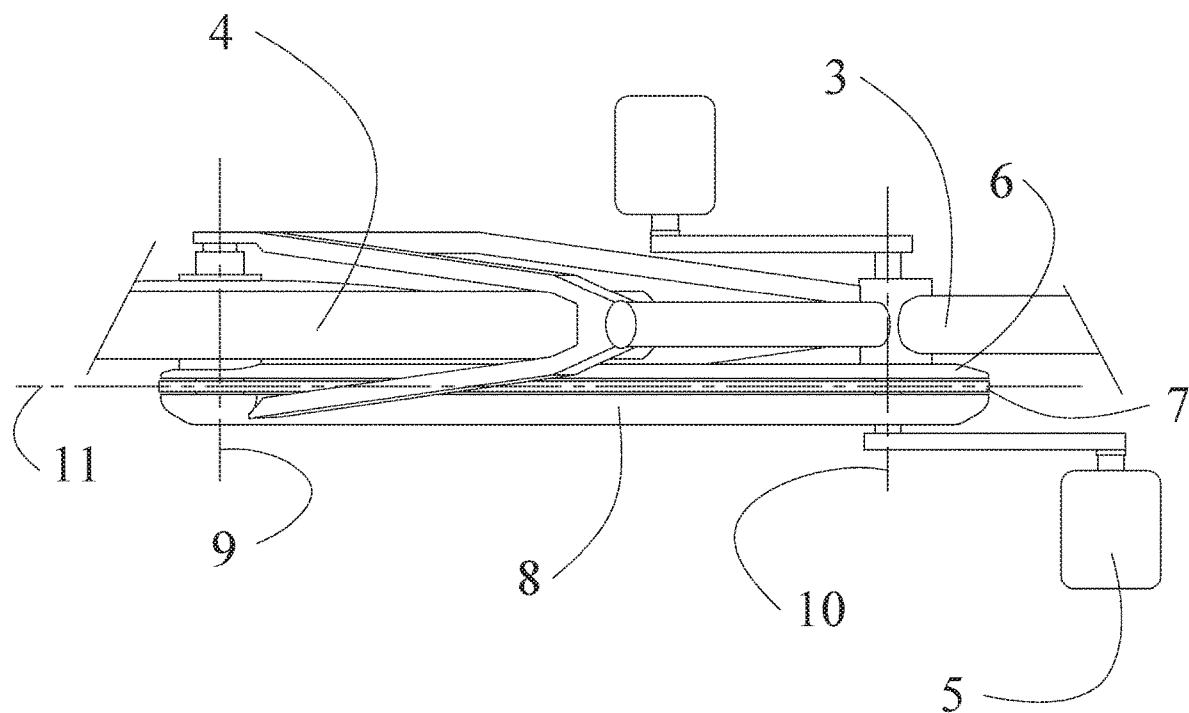
FIG. 3 is a top view of the belt drive system of FIG. 2.

As shown in FIG. 3, the illustrated embodiment comprises a bicycle frame 3 fitted with a rear hub wheel assembly 4 rotatable about a rear wheel sprocket axis 9, a pedal crank assembly 5 rotatable about a pedal crank sprocket axis 10, an inner belt cover 6, an outer belt cover 8 and a belt drive 7 aligned substantially longitudinally and parallel with chain line plane 11. FIG. 3 shows the lateral positioning of inner belt cover 6 and outer belt cover 8 such that there is a nominal clearance gap of up to 10 mm between belt drive 7 and inner belt cover 6 and outer belt cover 8 when viewed as shown.

Figure 4:
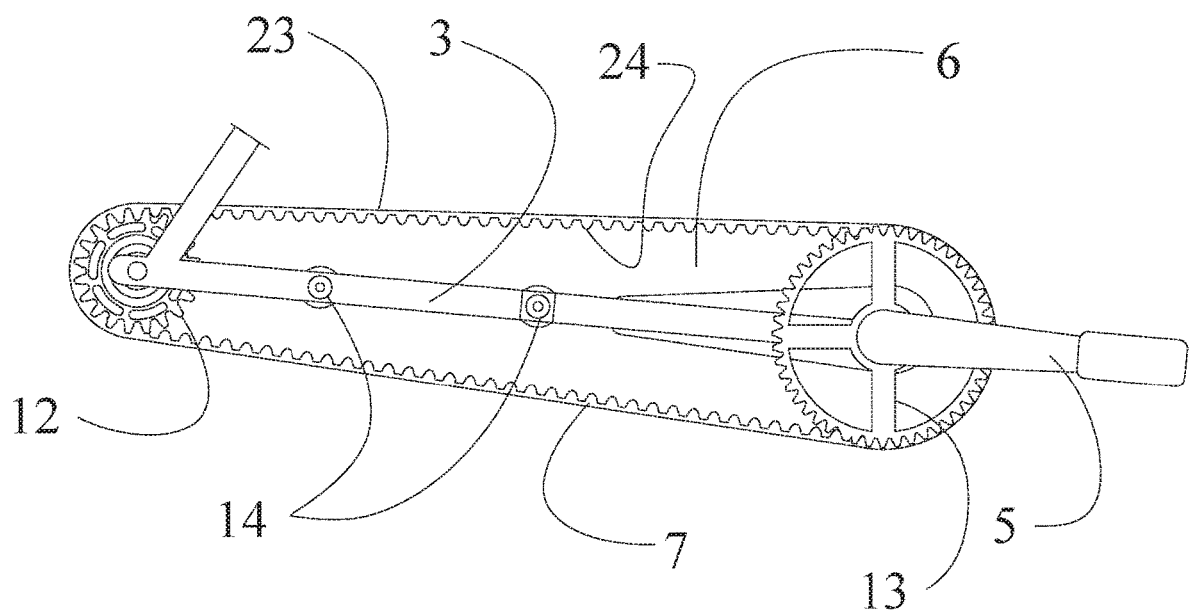
FIG. 4 is a right side view of the belt drive system of FIG. 2.

FIG. 4 is a right side view with outer belt cover 8 removed. The bicycle frame 3 is fitted with a plurality of belt cover mounting fixtures 14 for rigidly attaching inner belt cover 6 as shown and outer belt cover 8. Rigidly attached to pedal crank assembly 5 is a front driving sprocket 13 engaged to belt drive 7 through inner toothed belt surface 24 in order to transmit power from rider input to pedal crank assembly 5 to a rear driven sprocket 12. Belt drive 7 comprises an outer non-toothed belt perimeter surface 23 and an inner toothed belt surface 24. The shape of inner belt cover 6 is shown to be aligned substantially with outer non-toothed belt perimeter surface 23 such that inner belt cover 6 is contained within outer non-toothed belt perimeter surface 23 and inner belt cover 6 does not protrude substantially beyond outer non-toothed belt perimeter surface 23.

Figure 5:
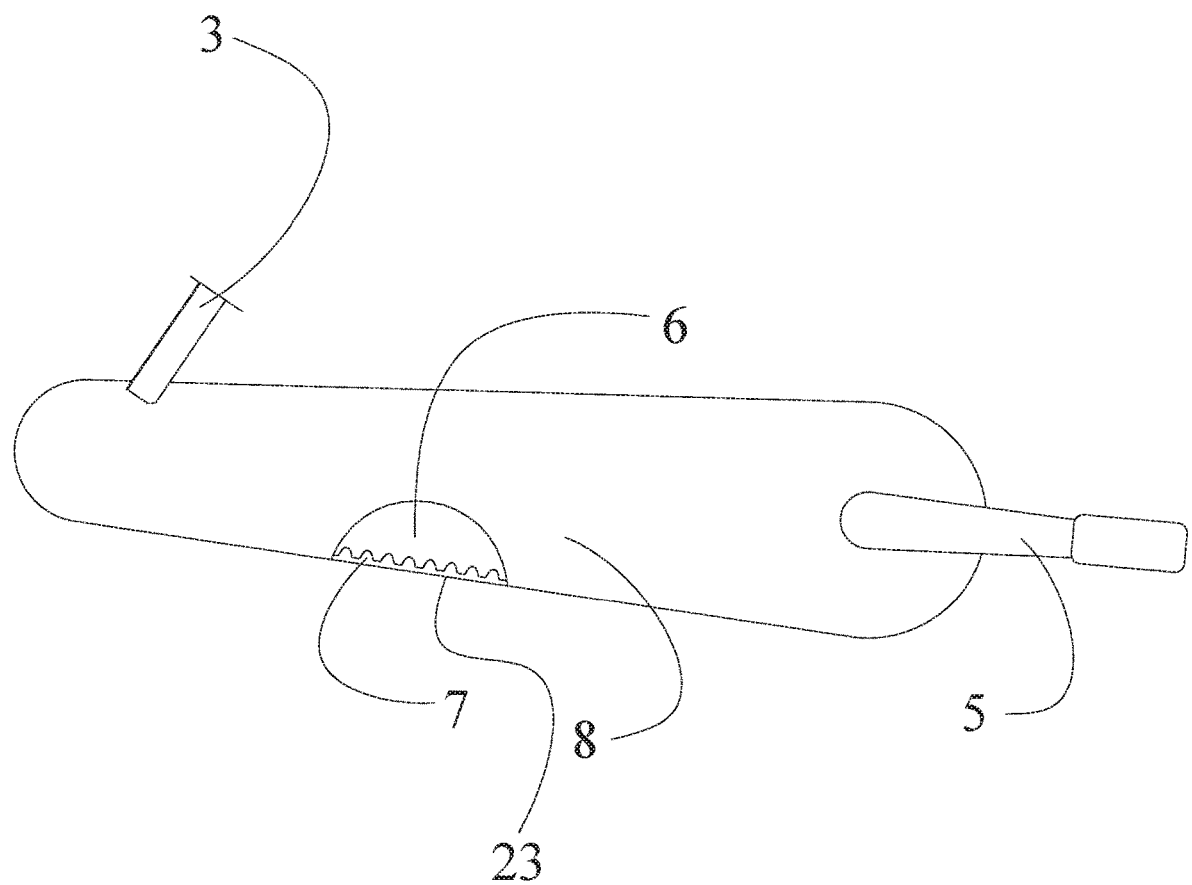
FIG. 5 is a right side cutaway view of the belt drive system of FIG. 2.

FIG. 5 is a right side cutaway view similar to FIG. 4 but including outer belt cover 8. As can be seen, the shape of outer belt cover 8 is shown to be aligned similarly to inner belt cover 6 and substantially with outer non-toothed belt perimeter surface 23 such that outer belt cover 8 is contained within outer non-toothed belt perimeter surface 23 and outer belt cover 8 does not protrude substantially beyond outer non-toothed belt perimeter surface 23.

Figure 6:
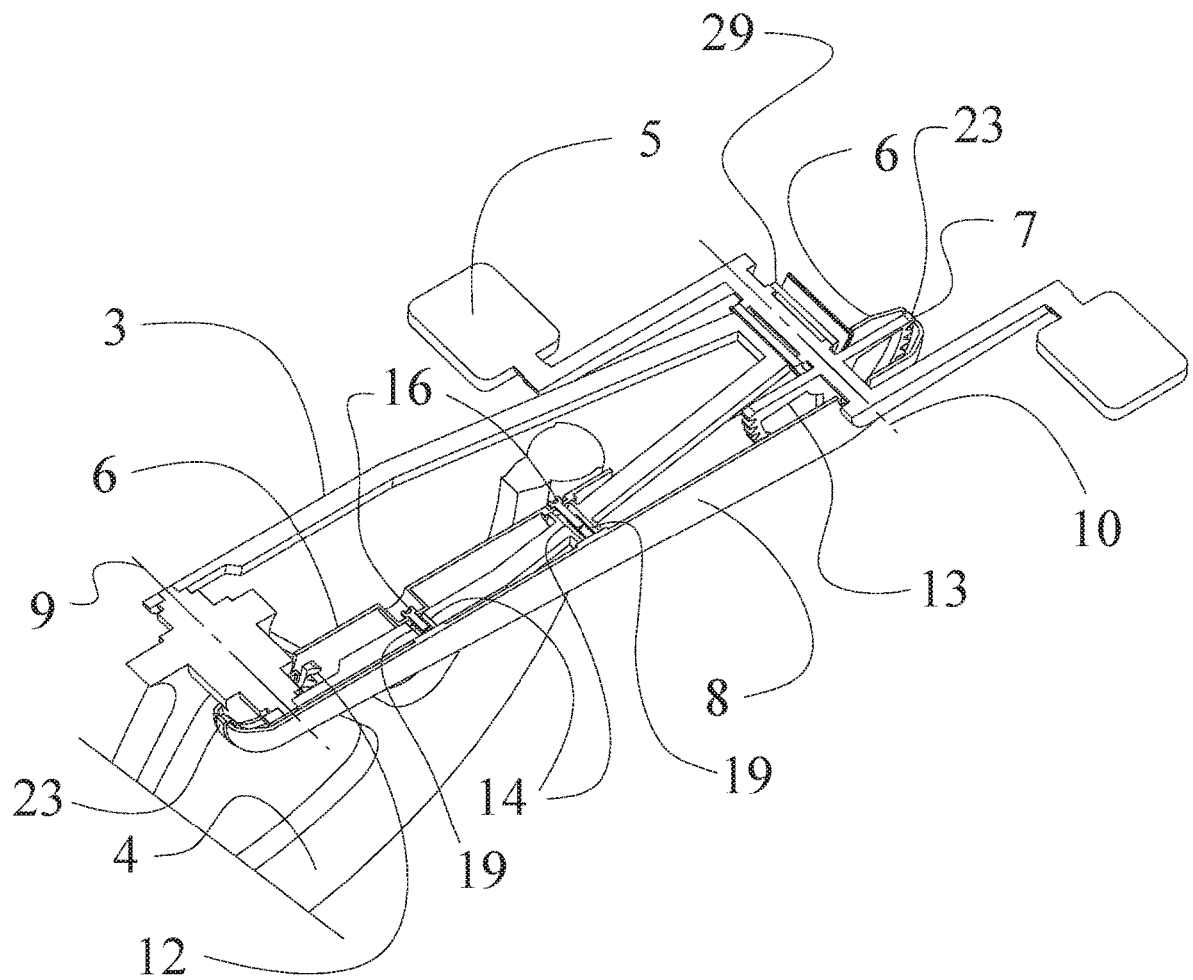
FIG. 6 is right perspective cross section view of the belt drive system of FIG. 2.

FIG. 6 shows a right perspective cross section view comprising a bicycle frame 3 fitted with a rear hub wheel assembly 4 rotatable about a rear wheel sprocket axis 9, a pedal crank assembly 5 rotatable about a pedal crank sprocket axis 10. Mounted to bicycle frame 3 is an eccentric bottom bracket assembly 29 for the purposes of adjusting the tension in belt drive 7 by changing the distance between rear wheel sprocket axis 9 and pedal crank sprocket axis 10. The nature of eccentric bottom bracket assembly 29 and its fixing arrangement to bicycle frame 3 is well known, and other means for adjusting belt drive 7 are contemplated such as horizontal rear frame dropouts or idler puller arrangements. Fitted to pedal crank assembly 5 is a front driving sprocket 13 and fitted to rear hub wheel assembly is a rear driven sprocket 12. Outer belt cover 8 is fitted with outer belt cover fixings 19 to receive cover mounting screws 16 such that inner belt cover 6 and outer belt cover 8 can be rigidly mounted to bicycle frame 3 by cover mounting fixtures 14. Cover mounting fixtures 14 are formed with gap clearance between cover mounting fixtures 14 and outer belt cover fixture 19 such that the position of outer belt cover 8 and inner belt cover 6 can be adjusted in order to conform to changes in position of outer non-toothed belt perimeter surface 23 as the distance between rear wheel sprocket axis 9 and pedal crank sprocket axis 10 changes when the tension of belt drive 7 is changed.

Figure 7:
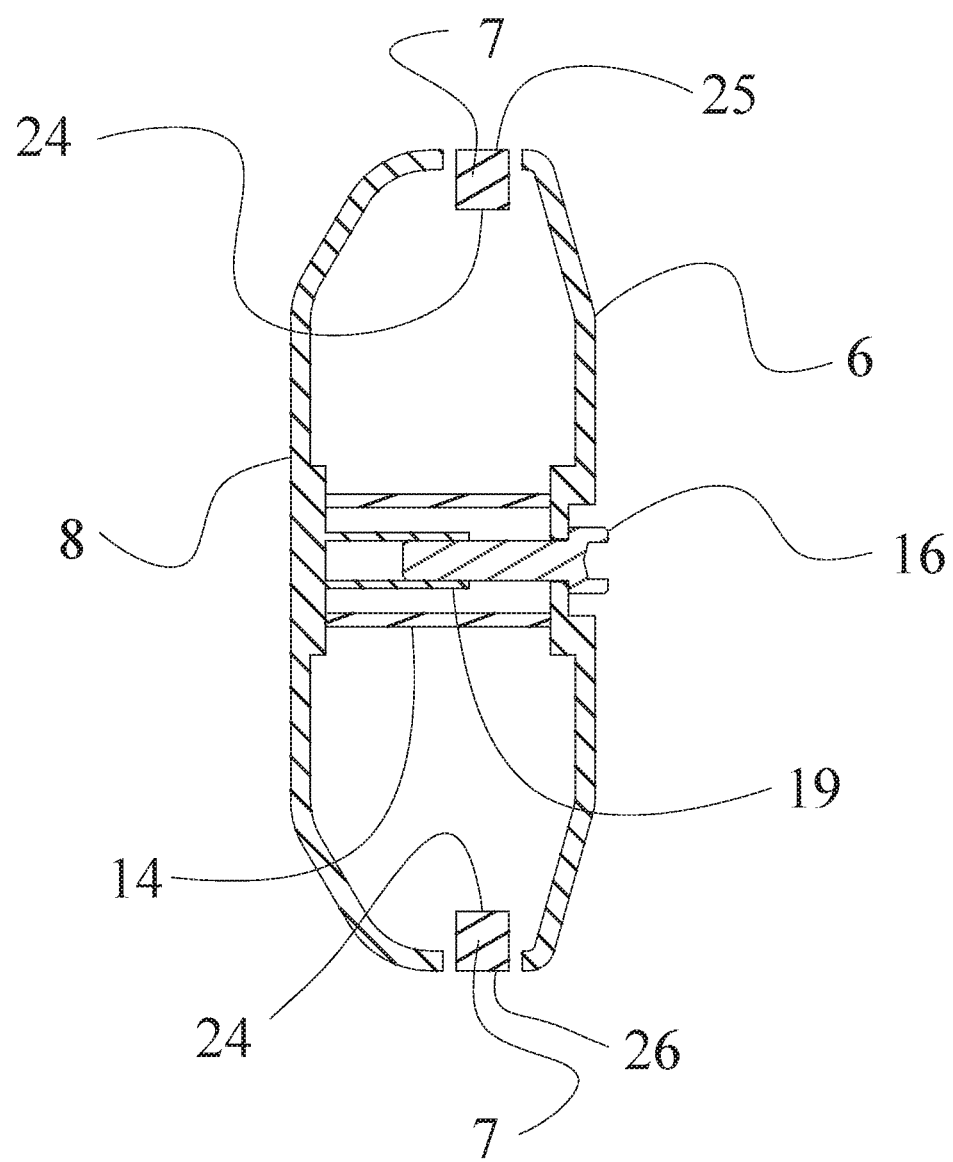
FIG. 7 is a vertical cross section view of the belt drive system of FIG. 2.

FIG. 7 shows a vertical cross section of the embodiment through cover mounting fixture 14. As shown, there is gap clearance between outer belt cover fixing 19 and cover mounting fixture 14 in order to afford changing the position of the outer belt cover 8 and inner belt cover 6 with respect to belt drive 7 and outer non-toothed belt perimeter surface 23. Outer belt cover fixing 19 is formed to receive cover mounting screws 16 in order that inner belt cover 6 and outer belt cover 8 can be rigidly fastened to cover mounting fixture 14. It should be noted that there are a number of well-known mounting arrangements to fix the inner belt cover 6 and outer belt cover 8 to bicycle frame 3, for example with flanges, screws, clips, and other fasteners. As shown in FIG. 7, inner belt cover 6 and outer belt cover 8 are formed and positioned such that they do not protrude substantially above top outer non-toothed belt perimeter surface 25 or below bottom outer non-toothed belt perimeter surface 26 and are generally aligned and there exists a nominally consistent and equal gap clearance of up to 10 mm between belt drive 7 and outer belt cover 8 and belt drive 7 and inner belt cover 6.

Figure 8:
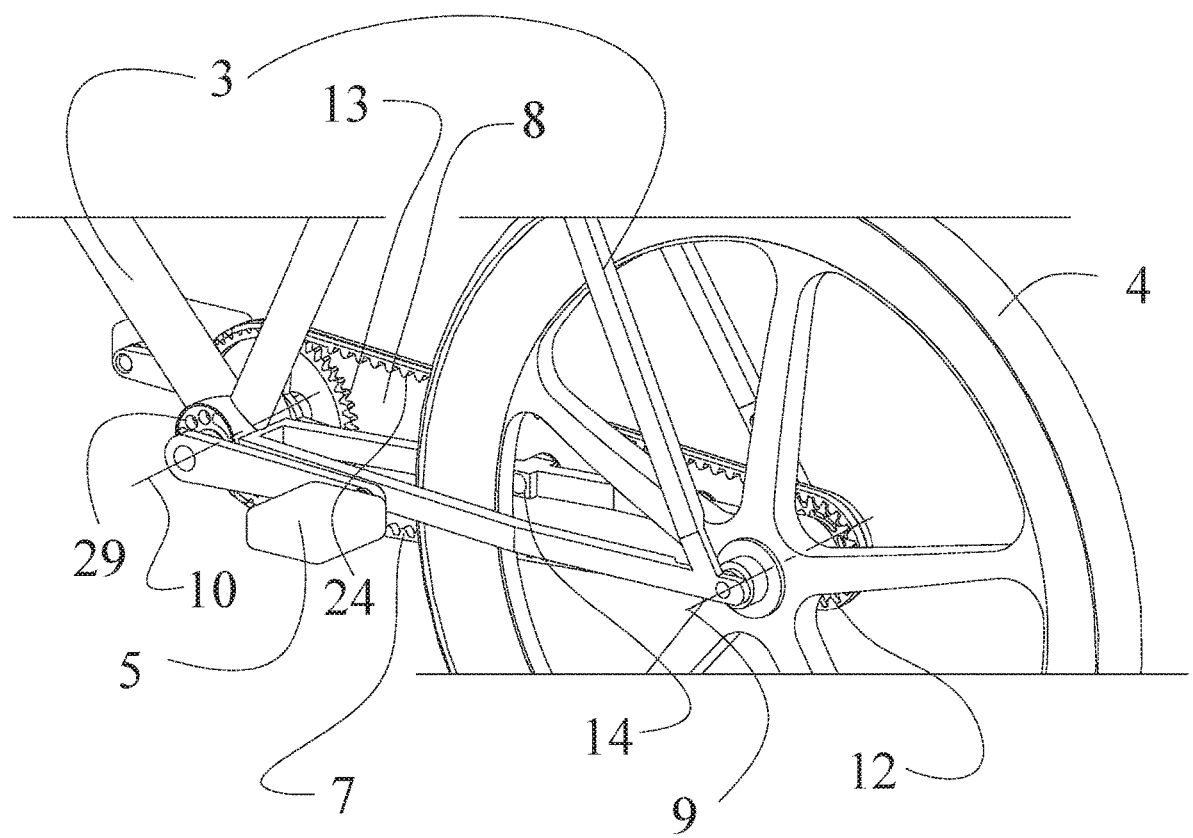
FIG. 8 is a left perspective view of an alternative embodiment of a belt drive system without an inner cover.

FIG. 8 shows an alternative single outer belt cover embodiment comprising a bicycle frame 3 with only an outer belt cover 8 attached to cover mounting fixing 14. The bicycle frame 3 is also shown fitted with a pedal crank assembly 5 attached via an eccentric bottom bracket assembly 29 for adjusting the tension of belt drive 7 by changing the distance between rear wheel sprocket axis 9 and pedal crank sprocket axis 10. Pedal crank assembly 5 is fitted with a front driving sprocket 13 engaged to belt drive 7 through inner toothed belt surface 24 in order to transmit power from rider input to pedal crank assembly 5 to a rear driven sprocket 12 and transferred through direct connection with rear hub wheel assembly 4. The alternative embodiment shown has the benefit of reduced weight and cost given it only employs a single outer belt cover 8 whilst still providing a reasonable degree of prevention of the rider's clothes becoming trapped between the front driving sprocket 13 and the inner toothed belt surface 24.

Figure 9:
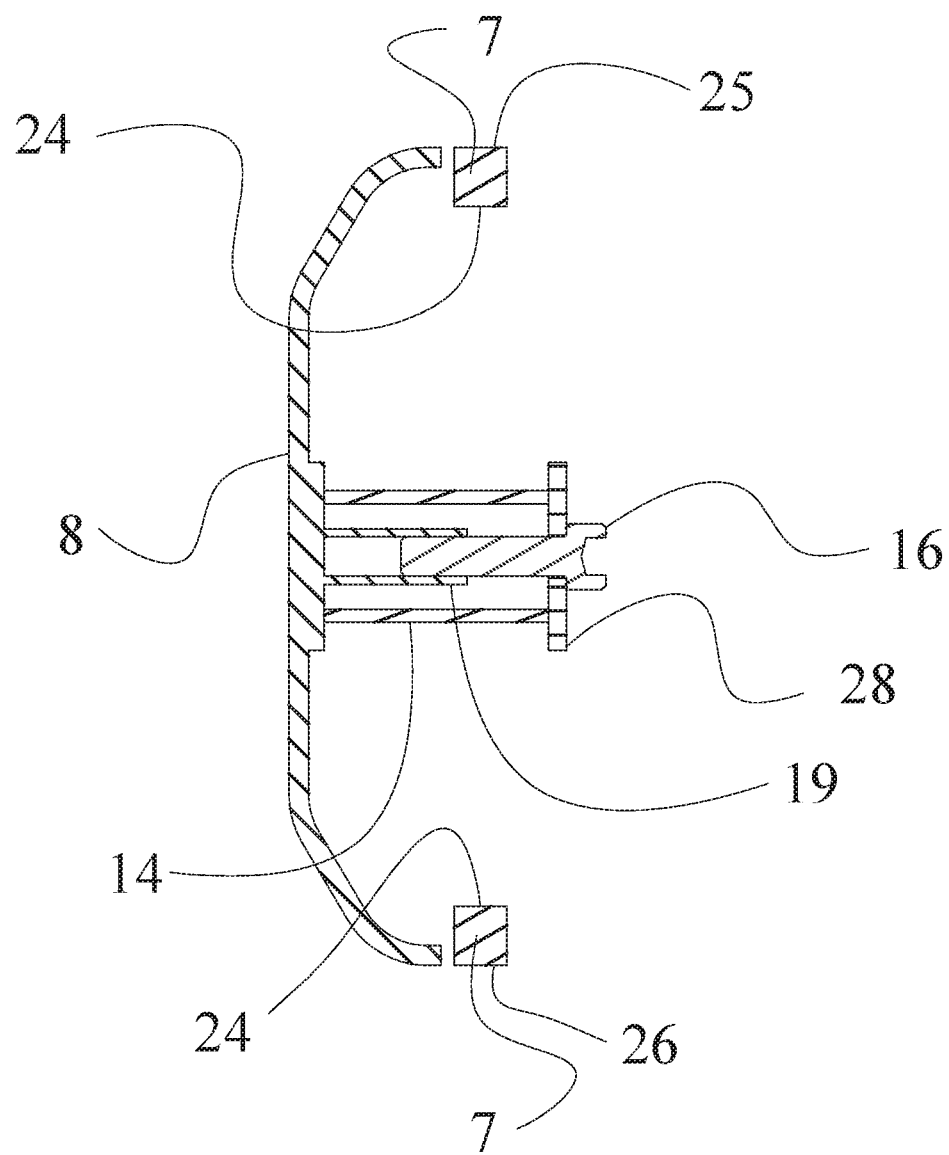
FIG. 9 is a vertical cross section view of the belt drive system of FIG. 8.

FIG. 9 shows a vertical cross section of the alternative single outer belt cover embodiment of FIG. 8 through cover mounting fixture 14. As shown, there is gap clearance between outer belt cover fixing 19 and cover mounting fixture 14 in order to afford changing the position of the outer belt cover 8 with respect to belt drive 7 and outer non-toothed belt perimeter surface 23. Outer belt cover fixing 19 is formed to receive cover mounting washer 28 and cover mounting screw 16 in order that outer belt cover 8 can be rigidly fastened to bicycle frame 3. It should be noted that there are a number of well-known mounting arrangements to fix said outer belt cover 8 to bicycle frame 3. As can be shown in FIG. 9, outer belt cover 8 is formed and positioned such that outer belt cover 8 does not protrude substantially above top outer non-toothed belt perimeter surface 25 or below bottom outer non-toothed belt perimeter surface 26 and is generally aligned and there exists a nominally consistent and equal gap clearance of up to 10 mm between belt drive 7 and outer belt cover 8.

Figure 10:
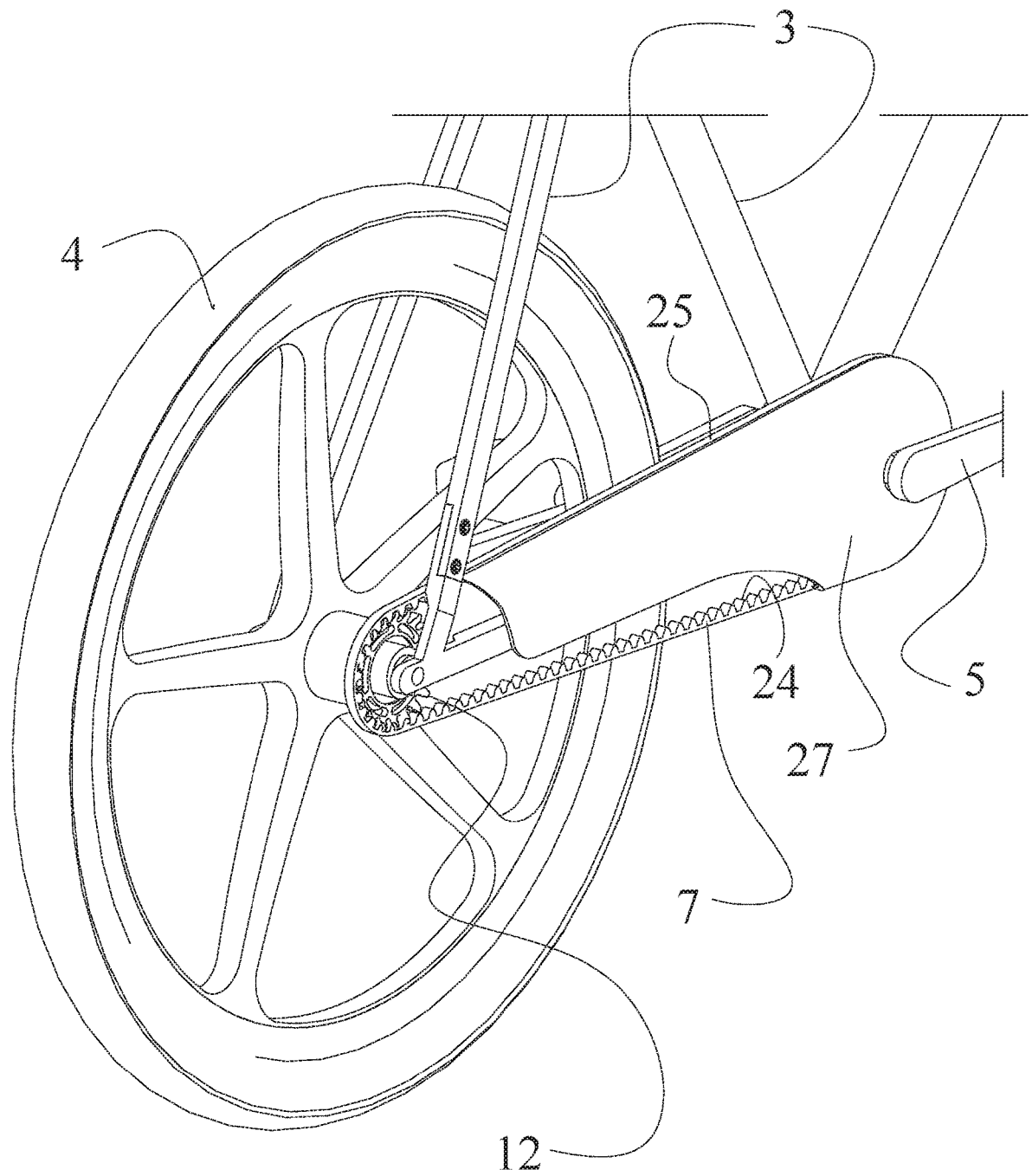
FIG. 10 is a right perspective view of an alternative embodiment of a belt drive system comprising a partial outer cover.

FIG. 10 shows another alternative embodiment comprising a partial outer belt cover. As shown in FIG. 10, the illustrated embodiment comprises a bicycle frame 3 fitted with a rear hub wheel assembly 4, a pedal crank assembly 5, a partial outer belt cover 27 and a belt drive 7 such that power rotatably input through pedal crank assembly 5 is transmittable to rear hub wheel assembly 4 through belt drive 7 and rear driven sprocket 12. As can be seen in FIG. 10, the partial outer belt cover 27 aligns with a substantial portion of top outer non-toothed belt perimeter surface 25 providing reasonable prevention of the rider's clothes from becoming trapped by inner toothed belt surface 24 whilst having the benefit of being light weight and low cost.

Figure 11:
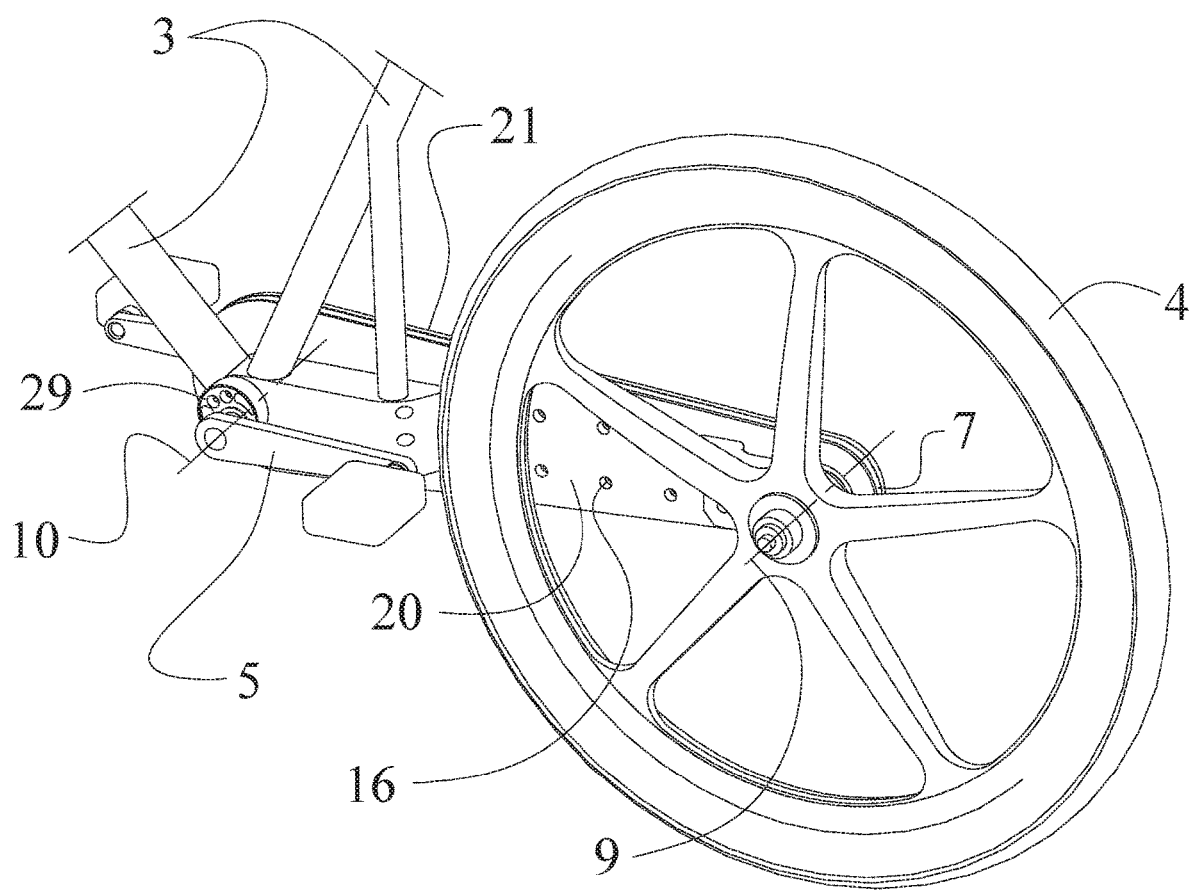
FIG. 11 is a left perspective view of an alternative belt drive system comprising a structural cover.

FIG. 11 shows a left perspective view of an alternative structural cover embodiment comprising an inner structural belt cover 20 mated rigidly to outer structural belt cover 21 with structural fixing screws 16. Inner structural belt cover 20 is rigidly connected to bicycle frame 3 and receives pedal crank assembly 5 fitted to eccentric bottom bracket 29. It should be noted that inner structural belt cover 20 could be rotatably mounted to bicycle frame 3 by many well understood alternative mounting arrangements in order to provide for suspension springing of rear hub wheel assembly 4. Rear hub wheel assembly 4 is rotatable about a rear wheel sprocket axis 9 and mounted to inner structural belt cover 20 by well-known and understood means of bicycle side mounted hub gear axle and nut fixing arrangements. Eccentric bottom bracket assembly 29 has the purpose of adjusting the tension in belt drive 7 by changing the distance between rear wheel sprocket axis 9 and pedal crank sprocket axis 10. The nature of eccentric bottom bracket assembly 29 and its fixing arrangement to bicycle frame 3 is well known, and other means for adjusting belt drive 7 are contemplated such as horizontal rear frame dropouts or idler puller arrangements.

Figure 12:
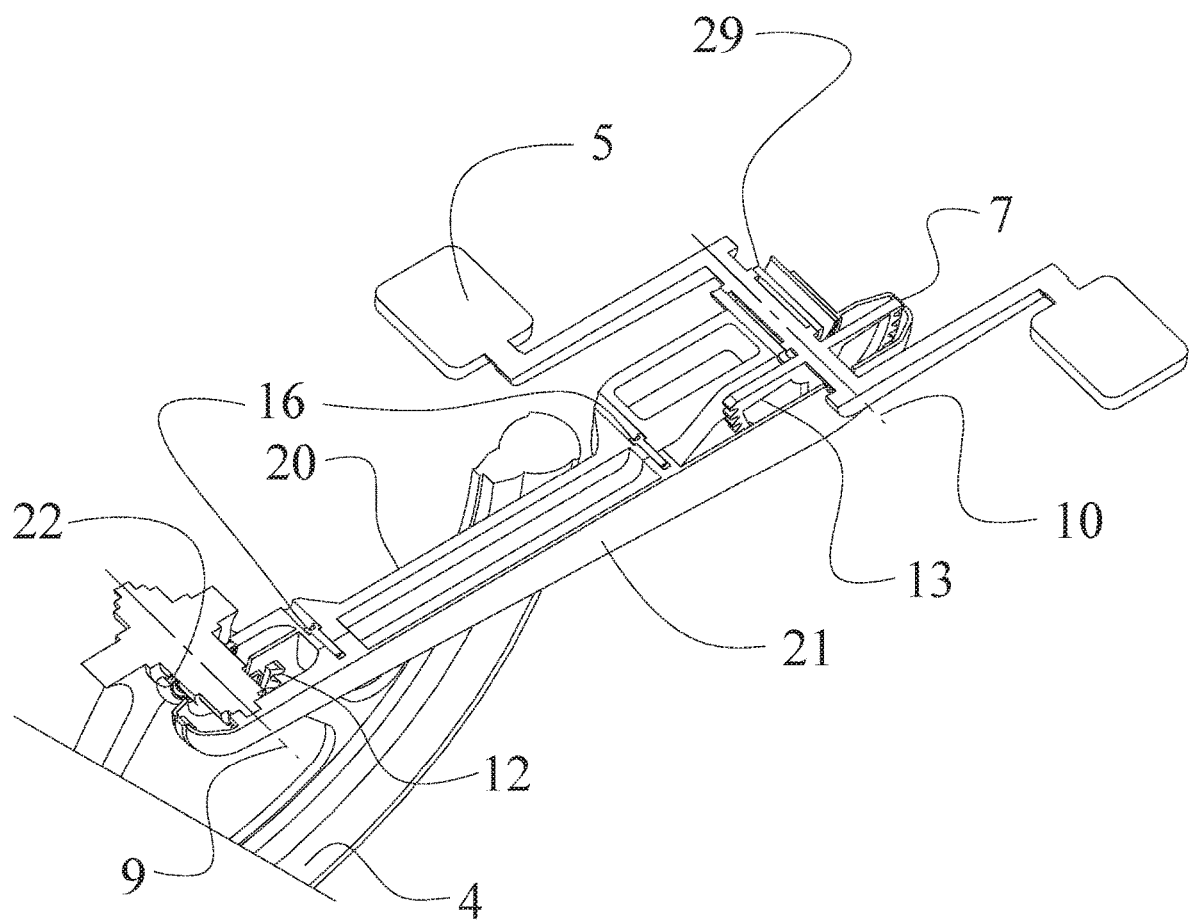
FIG. 12 is right perspective view of the belt drive system of FIG. 11.

FIG. 12 shows the embodiment of FIG. 11 comprising an inner structural belt cover 20 mated rigidly to outer structural belt cover 21 with structural fixing screws 16. Inner structural belt cover 20 receives pedal crank assembly 5 fitted to eccentric bottom bracket 29. Rear hub wheel assembly 4 is rotatable about a rear wheel sprocket axis 9 and mounted to inner structural belt cover 20 by rear hub bearing 22 which is of the standard deep groove ball bearing type and rear hub wheel assembly 4 is rigidly fixed to outer structural belt cover 21 through well-known and understood means of bicycle axle and nut fixing. Fitted pedal crank assembly 5 is a front driving sprocket 13 and fitted to rear hub wheel assembly is a rear driven sprocket 12. The nature of construction of inner structural belt cover 20 and outer structural cover 21 is ideally made from light weight alloy or composite materials through pressure moulding, casting, injection moulding, forging or forming processes and designed using well understood technics in such a way as to be able to sufficiently support rear hub wheel assembly 4. The inner structural belt cover 20 and outer structural belt cover 21 form an essential part of the structural integrity of bicycle frame 3 in the embodiment presented in FIG. 12. Eccentric bottom bracket assembly 29 has the purpose of adjusting the tension in belt drive 7 by changing the distance between rear wheel sprocket axis 9 and pedal crank sprocket axis 10. The nature of eccentric bottom bracket assembly 29 and its fixing arrangement to bicycle frame 3 is well known, and other means for adjusting belt drive 7 are contemplated such as horizontal rear frame dropouts or idler puller arrangements.

Figure 13:
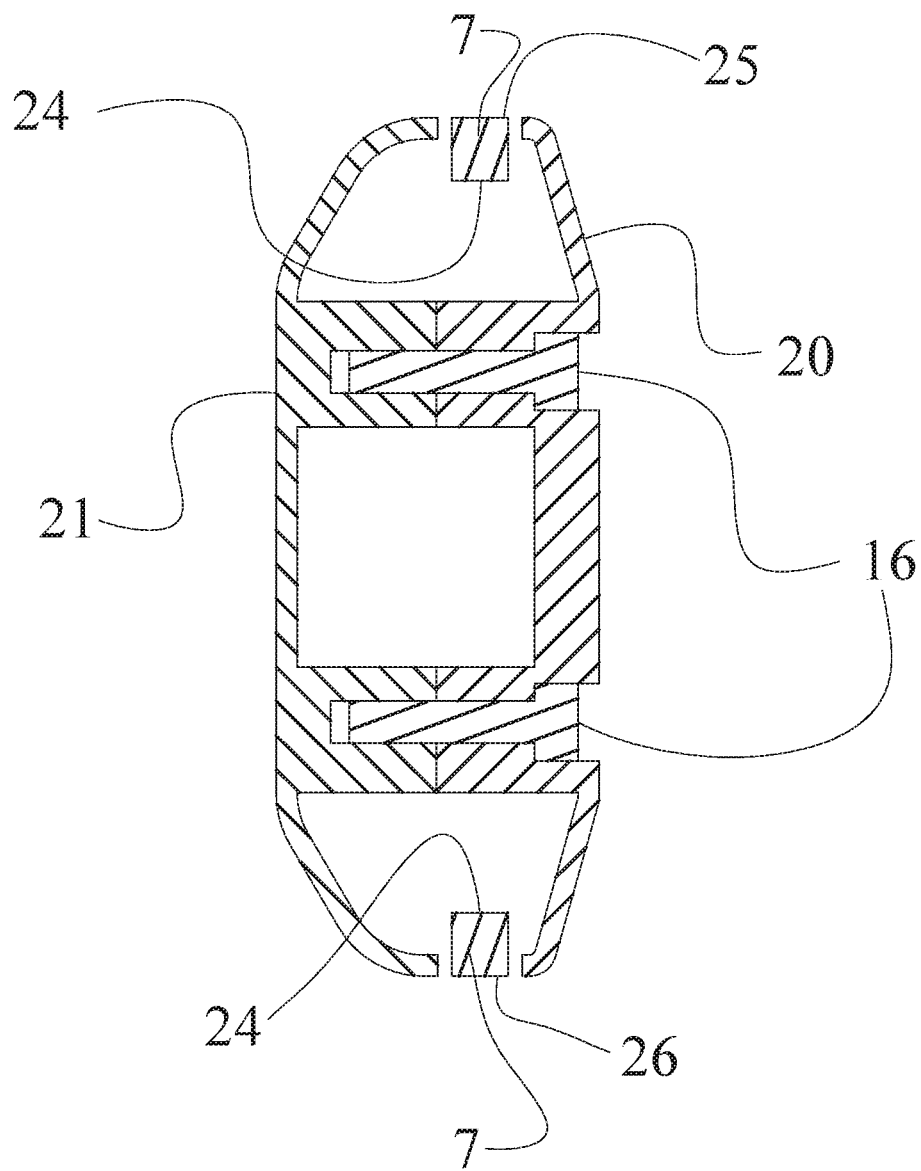
FIG. 13 is a vertical cross section view of the belt drive system of FIG. 11.

FIG. 13 shows a vertical cross section of the alternative structural cover embodiment of FIGS. 11 and 12 through structural fixing screws 16. As can be shown, structural inner belt cover 20 and structural outer belt cover 21 are formed and positioned such that they do not protrude substantially above top outer non-toothed belt perimeter surface 25 or below bottom outer non-toothed belt perimeter surface 26 and are generally aligned and there exists a nominally consistent and equal gap clearance of up to 10 mm between belt drive 7 and structural inner belt cover 20 and structural outer belt cover 21 and belt drive 7.

The invention claimed is:

1. A pedal driven cycle comprising:
a belt drive connecting a power input sprocket to a driven sprocket along a chain line;
an outer protective belt drive cover plate having a footprint which substantially coincides with a side profile of the belt drive along at least a major portion of its length of travel so that the outer cover plate does not extend beyond an outer surface of the belt drive; and
fixtures for mounting the outer protective belt drive cover plate to the cycle in parallel with the chain line and laterally spaced apart from a side edge of the belt drive to provide a clearance, with fore and aft adjustment.

2. The pedal drive cycle of claim 1, wherein the clearance is no more than 10 mm.

3. The pedal drive cycle of claim 2, wherein the clearance is no more than 8 mm.

4. The pedal drive cycle of claim 2, wherein the clearance is no more than 5 mm.

5. The pedal drive cycle of claim 2, wherein the clearance is approximately 2 mm.

6. The pedal drive cycle of claim 1, wherein the fore and aft adjustment is relative to one or both of the input sprocket and the driven sprocket.

7. The pedal drive cycle of claim 1, further comprising an inner protective belt drive cover plate having a second footprint that substantially coincides with the footprint of the outer protective belt drive cover plate, wherein the inner protective belt drive cover plate is substantially aligned with the outer protective belt driver cover plate and laterally spaced apart from an inside edge of the belt drive to provide a second clearance.

8. The pedal drive cycle of claim 7, wherein the inner protective belt drive cover plate is not a structural part of a frame of the cycle.

9. The pedal drive cycle of claim 7, wherein the inner protective belt drive cover plate is a structural part of a frame of the cycle.

10. The pedal drive cycle of claim 7, wherein the second clearance is no more than 10 mm.

11. The pedal drive cycle of claim 10, wherein the second clearance is no more than 8 mm.

12. The pedal drive cycle of claim 10, wherein the second clearance is no more than 5 mm.

13. The pedal drive cycle of claim 10, where the second clearance is approximately 2 mm.

14. The pedal drive cycle of claim 1, wherein the outer protective belt drive cover plate is not a structural part of a frame of the cycle.

15. The pedal drive cycle of claim 1, wherein the outer protective belt drive cover plate is a structural part of a frame of the cycle.

16. The pedal drive cycle of claim 1, wherein the footprint of the outer protective belt drive cover plate substantially coincides with a side profile of the belt drive along an entire length of the belt drive.

* * * * *